US009109133B2

(12) United States Patent
Yamazaki et al.

(10) Patent No.: US 9,109,133 B2
(45) Date of Patent: Aug. 18, 2015

(54) INK JET INK AND RECORDED OBJECT

(71) Applicant: Seiko Epson Corporation, Tokyo (JP)

(72) Inventors: Soichi Yamazaki, Shiojiri (JP); Hideki Okada, Shiojiri (JP); Hiroaki Kumeta, Matsumoto (JP); Daisuke Ishihara, Matsumoto (JP)

(73) Assignee: Seiko Epson Corporation (JP)

( * ) Notice: Subject to any disclaimer, the term of this patent is extended or adjusted under 35 U.S.C. 154(b) by 175 days.

(21) Appl. No.: 13/852,330

(22) Filed: Mar. 28, 2013

(65) Prior Publication Data
US 2013/0281593 A1 Oct. 24, 2013

(30) Foreign Application Priority Data

Apr. 19, 2012 (JP) ................. 2012-095952
Nov. 16, 2012 (JP) ................. 2012-252301

(51) Int. Cl.
C04B 24/26 (2006.01)
C08J 3/00 (2006.01)
C08K 5/06 (2006.01)
C08L 33/00 (2006.01)
C08L 75/00 (2006.01)
C08G 18/08 (2006.01)
C08G 18/28 (2006.01)
C08G 73/10 (2006.01)
C09D 5/00 (2006.01)
C09D 11/00 (2014.01)
C09D 11/10 (2014.01)
C09D 11/38 (2014.01)
C09D 11/36 (2014.01)
C09D 5/02 (2006.01)
C09D 7/12 (2006.01)
C09D 133/10 (2006.01)
C09D 11/023 (2014.01)
C08J 3/20 (2006.01)
C09D 125/08 (2006.01)
(Continued)

(52) U.S. Cl.
CPC . *C09D 11/38* (2013.01); *C08J 3/00* (2013.01); *C08J 3/20* (2013.01); *C08K 5/00* (2013.01); *C08K 5/05* (2013.01); *C08K 5/06* (2013.01); *C08K 5/175* (2013.01); *C08L 25/08* (2013.01); *C08L 33/08* (2013.01); *C08L 33/10* (2013.01); *C08L 75/00* (2013.01); *C08L 75/04* (2013.01); *C09D 5/024* (2013.01); *C09D 5/028* (2013.01); *C09D 7/007* (2013.01); *C09D 7/12* (2013.01); *C09D 7/125* (2013.01); *C09D 7/1233* (2013.01); *C09D 11/00* (2013.01); *C09D 11/023* (2013.01); *C09D 11/10* (2013.01); *C09D 11/102* (2013.01); *C09D 11/107* (2013.01); *C09D 11/30* (2013.01); *C09D 11/322* (2013.01); *C09D 11/36* (2013.01); *C09D 125/08* (2013.01); *C09D 133/08* (2013.01); *C09D 133/10* (2013.01); *C09D 175/00* (2013.01); *C09D 175/04* (2013.01); *C09D 201/00* (2013.01); *C08J 2300/00* (2013.01); *C08J 2300/12* (2013.01); *C08J 2325/08* (2013.01); *C08J 2333/08* (2013.01); *C08J 2333/10* (2013.01); *C08J 2375/00* (2013.01); *C08J 2375/04* (2013.01); *C08J 2400/00* (2013.01); *C08J 2400/12* (2013.01); *C08J 2425/08* (2013.01); *C08J 2433/08* (2013.01); *C08J 2433/10* (2013.01); *C08J 2475/00* (2013.01); *C08J 2475/04* (2013.01); *C08L 2201/50* (2013.01); *C08L 2201/52* (2013.01); *C08L 2205/00* (2013.01); *C08L 2205/02* (2013.01); *C08L 2205/025* (2013.01); *C08L 2207/00* (2013.01)

(58) Field of Classification Search
CPC ............... C08J 3/00; C08J 3/20; C08J 23/00; C08J 2300/00; C08J 2300/12; C08J 2325/08; C08J 2333/08; C08J 2333/10; C08J 2375/00; C08J 2375/04; C08J 2400/00; C08J 2400/12; C08J 2425/08; C08J 2433/08; C08J 2433/10; C08J 2475/00; C08J 2475/04; C08K 5/00; C08K 5/05; C08K 5/055; C08K 5/06; C08K 5/175; C08L 25/08; C08L 33/08; C08L 33/10; C08L 75/00; C08L 75/04; C08L 2201/50; C08L 2201/52; C08L 2205/00; C08L 2205/02; C08L 2205/025; C08L 2207/00; C09D 5/024; C09D 5/028; C09D 7/007; C09D 7/12; C09D 7/1233; C09D 7/125; C09D 11/00; C09D 11/023; C09D 11/10; C09D 11/102; C09D 11/107; C09D 11/30; C09D 11/332; C09D 11/36; C09D 125/08; C09D 133/08; C09D 133/10; C09D 175/00; C09D 175/04; C09D 201/00; C09D 11/38; C09D 11/322
USPC .......... 523/160, 161; 524/376, 377, 507, 523, 524/589, 590, 591, 839, 840
See application file for complete search history.

(56) References Cited

U.S. PATENT DOCUMENTS 8,133,314 B2 3/2012 Ishihara et al.
2010/0086691 A1 4/2010 Mukai et al.

FOREIGN PATENT DOCUMENTS

JP 2004-338291 12/2004
JP 2005-082663 3/2005

(Continued)

*Primary Examiner* — Patrick Niland
(74) *Attorney, Agent, or Firm* — Harness, Dickey & Pierce, P.L.C.

(57) ABSTRACT

The ink jet ink includes pigment, first resin which has a glass-transition temperature of less than 20° C. and a weight-average molecular weight of not more than 10000, second resin which has a glass-transition temperature of not less than 23° C., and specific polyoxyalkylene glycol monoalkyl ether.

10 Claims, 1 Drawing Sheet

(51) Int. Cl.

| | | |
|---|---|---|
| *C09D 175/00* | (2006.01) | |
| *C09D 11/107* | (2014.01) | |
| *C09D 7/00* | (2006.01) | |
| *C09D 201/00* | (2006.01) | |
| *C09D 133/08* | (2006.01) | |
| *C09D 11/102* | (2014.01) | |
| *C09D 175/04* | (2006.01) | |
| *C09D 11/30* | (2014.01) | |
| *C08L 75/04* | (2006.01) | |
| *C08L 25/08* | (2006.01) | |
| *C08L 33/08* | (2006.01) | |
| *C08K 5/17* | (2006.01) | |
| *C08K 5/00* | (2006.01) | |
| *C08L 33/10* | (2006.01) | |
| *C08K 5/05* | (2006.01) | |
| *C09D 11/322* | (2014.01) | |

(56) References Cited

FOREIGN PATENT DOCUMENTS

| JP | 2010-090271 | | 4/2010 |
|---|---|---|---|
| JP | 2010-248477 | | 11/2010 |
| WO | WO 2007/112337 A2 | * | 10/2007 |
| WO | WO 2011/067915 | * | 6/2011 |

* cited by examiner

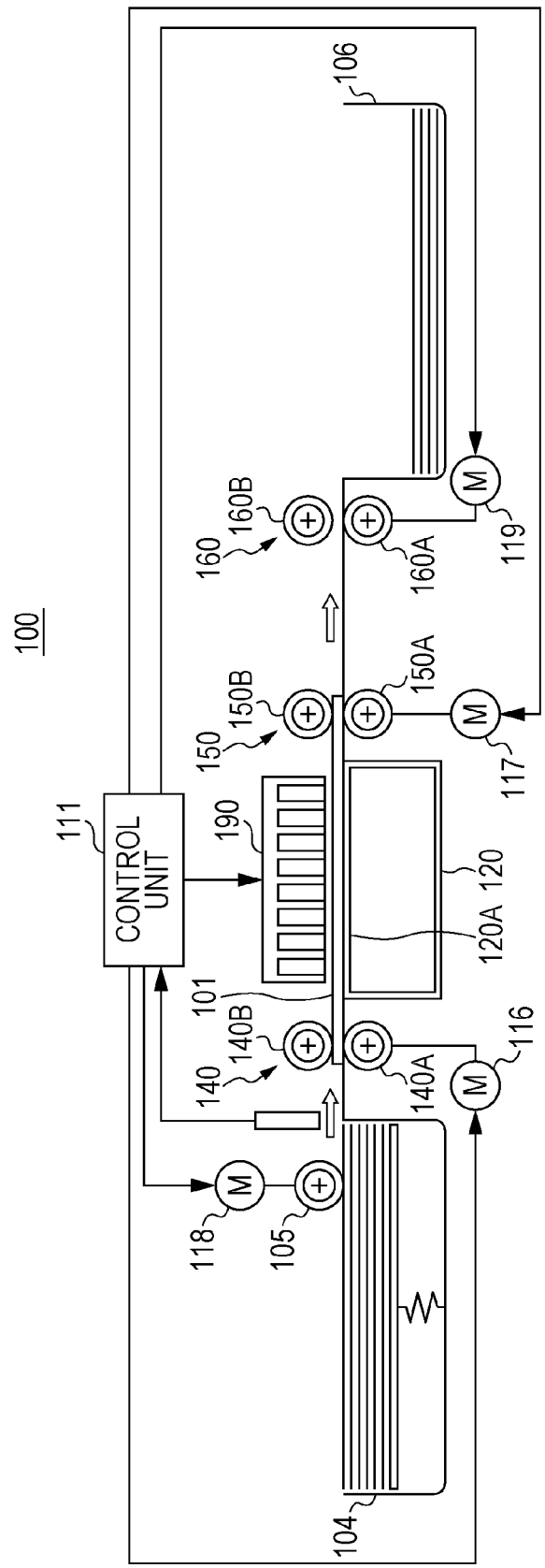

INK JET INK AND RECORDED OBJECT

The entire disclosure of Japanese Application Nos. 2012-095952 filed on Apr. 19, 2012 and 2012-252301 filed on Nov. 16, 2012 are expressly incorporated by reference herein.

BACKGROUND

1. Technical Field

The present invention relates to ink jet ink and a recorded object.

2. Related Art

In the related art, recording an image by ejecting ink jet ink from an ink jet recording apparatus onto a recording medium such as a paper has been known.

As ink jet ink, ink which is obtained by dissolving or dispersing pigment and resin in solvent such as water has been generally known.

The ink jet ink has been required to have a performance for obtaining a recorded image which is excellent in a chromogenic property, scratch resistance, and the like, and an ink jet ink has been developed in consideration of such a performance (see JP-A-2010-90271).

However, the ink jet ink in the related art has a problem that sufficient glossiness cannot be obtained in a recorded image. Particularly, there is a problem that glossiness of an image recorded on a dedicated glossy paper is low.

SUMMARY

An advantage of some aspects of the invention is to provide ink jet ink capable of recording an image which is excellent in glossiness and a recorded object with an image, which is excellent in glossiness, recorded thereon.

Such an advantage can be achieved by the following aspects of the invention.

According to an aspect of the invention, there is provided ink jet ink including pigment, first resin (A) with a glass-transition temperature of less than 20° C. and a weight-average molecular weight of not more than 10000, second resin (B) with a glass-transition temperature of not less than 23° C., and polyoxyalkylene glycol monoalkyl ether (C) which is at least one of a compound (C1) represented by Equation (1) and a compound (C2) represented by Equation (2).

(1)

(In the equation, R represents an x-valent alkoxy group containing four to thirty carbons, PO represents a propyleneoxy group, EO represents an ethyleneoxy group, m represents an integer from zero to ten, n represents an integer from ten to thirty, and X represents an integer from one to three.)

(2)

(In the equation, R represents an x-valent alkoxy group containing four to thirty carbons, EO represents an ethyleneoxy group, and n represents an integer from four to twenty.)

In this case, it is possible to provide ink jet ink capable of recording an image which is excellent in glossiness.

According to the aspect, a content ratio of the polyoxyalkylene glycol monoalkyl ether (C) with respect to the sum of the content of the first resin (A) and the second resin (B) is preferably not less than 0.25 and not more than 0.50.

In this case, it is possible to achieve more excellent glossiness of a recorded image.

According to the aspect, a weight-average molecular weight of the second resin (B) is preferably more than 10000.

In this case, it is possible to achieve more excellent glossiness of a recorded image and further enhance scratch resistance of the recorded image.

According to the aspect, the first resin (A) is preferably at least one kind selected from a group consisting of styrene acrylate copolymer and polyurethane resin.

In this case, it is possible to achieve more excellent glossiness of a recorded image.

According to the aspect, the second resin (B) is preferably at least one kind selected from a group consisting of styrene acrylate copolymer and polyurethane resin.

In this case, it is possible to achieve more excellent glossiness of a recorded image.

According to the aspect, the ink jet ink preferably further include an amphoteric ion compound.

In this case, it is possible to more effectively suppress unevenness of image density and achieve more excellent glossiness of a recorded image.

According to the aspect, the amphoteric ion compound is preferably a betaine series compound with a molecular weight of not less than 100 and not more than 250.

In this case, it is possible to more effectively suppress unevenness of image density and achieve more excellent glossiness of a recorded image.

According to the aspect, the content of the amphoteric ion compound is preferably not less than 5% by mass and not more than 40% by mass.

In this case, it is possible to more effectively suppress unevenness of image density and achieve more excellent glossiness of a recorded image.

The record object according to another embodiment of the invention is obtained by applying the ink jet ink according to an embodiment of the invention onto a recording medium by an ink jet method.

In this case, it is possible to provide a recorded object with an image, which is excellent in glossiness, recorded thereon.

BRIEF DESCRIPTION OF THE DRAWINGS

The invention will be described with reference to the accompanying drawings, wherein like numbers reference like elements.

FIGURE is a diagram schematically showing an example of an ink jet recording apparatus.

DESCRIPTION OF EXEMPLARY EMBODIMENTS

Hereinafter, a detailed description will be given of preferable embodiments of the invention.

Ink Jet Ink

First, a description will be given of ink jet ink according to the invention.

The ink jet ink according to the invention is ink for recording an image by being applied onto a recording medium by an ink jet method.

Incidentally, ink jet ink has been required to have a performance for obtaining a recorded image which is excellent in a chromogenic property, scratch resistance, and the like, and ink jet ink has been developed in consideration of such a performance.

However, ink jet ink in the related art has a problem that sufficient glossiness cannot be obtained in a recorded image. Particularly, there is a problem that glossiness of an image recorded on a dedicated glossy paper is low.

On the other hand, the ink jet ink according to the invention is characterized by including: pigment; first resin (A) with a glass-transition temperature of less than 20° C. and a weight-average molecular weight of not more than 10000; second resin (B) with a glass-transition temperature of not less than 23° C.; and polyoxyalkylene glycol monoalkyl ether (C) which is at least one of a compound (C1) represented by Equation (1) and a compound (C2) represented by Equation (2). With such a characteristic, it is possible to enhance smoothness of a surface of a recorded image. As a result, it is possible to obtain an image which is excellent in glossiness. It is possible to effectively record an excellent image when the image is recorded on a dedicated glossy paper, in particular. In addition, it is possible to record an image which is excellent in a chromogenic property and scratch resistance.

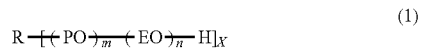
(1)

(In the equation, R represents an x-valent alkoxy group containing four to thirty carbons, PO represents a propyleneoxy group, EO represents an ethyleneoxy group, m represents an integer from zero to ten, n represents an integer from ten to thirty, and X represents an integer from one to three.)

(2)

(In the equation, R represents an x-valent alkoxy group containing four to thirty carbons, EO represents an ethyleneoxy group, and n represents an integer from four to twenty.

Hereinafter, a detailed description will be given of the respective constituents.

Pigment

As pigment contained in the ink jet ink according to the invention, any of known inorganic pigment and organic pigment can be used. Examples of such pigment include phthalocyanine system pigment, azo system pigment, anthraquinone system pigment, azomethine system pigment, and condensed ring system pigment as well as pigment such as pigment yellow, pigment red, pigment violet, pigment blue, and pigment black which are described in a color indexes. In addition, the examples further include organic pigment such as yellow color Nos. 4, 5, 205, and 401, orange color Nos. 228 and 405, blue color Nos. 1 and 404 and inorganic pigment such as carbon black, titanium oxide, zinc oxide, zirconium oxide, iron oxide, ultramarine, iron blue, and chromium oxide.

Examples listed in the pigment color indexes include C. I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, and the like, C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, and the like, C. I. pigment violet 19, 23, 32, 33, 36, 38, 43, 50, and the like, C. I. pigment blue 1, 2, 3, 15, 15:1, 15:2, 15:3, 15:4, 15:6, 15:34, 16, 18, 22, 25, 60, 65, 66, and the like, C. I. vat blue 4, 60, and the like, C. I. pigment green 7 and 10, C. I. pigment brown 3, 5, 25, and 26, C. I. pigment orange 2, 5, 7, 13, 14, 15, 16, 24, 34, 36, 38, 40, 43, 63, and the like, and C. I. pigment black 1, 7, and the like. One kind or two or more kinds of pigment can be added to the ink jet ink.

The pigment used in the ink jet ink according to an aspect of the invention may be in the form of resin dispersion. The pigment in such a form is preferably blended in the ink jet ink as pigment dispersion liquid in which the pigment are dispersed in a water-based medium along with dispersant such as polymer dispersant or surfactant by using ball mill, bead mill, a high-pressure homogenizer, or a high-speed stirring type disperser. Alternatively, it is preferable that the pigment in such a form be processed as self-dispersion type pigment, which is dispersed and/or dissolved in water-based solvent by bonding dispersibility-imparting group (hydrophilic function group and/or salt thereof) to the surface of the pigment directly or indirectly via an alkyl group, an alkyl ether group, or an aryl group, and be blended in the ink jet ink as a pigment dispersion liquid in which the pigment is dispersed in the water-based solvent.

Examples of the dispersant include natural polymer compounds such as glue, gelatin, and saponin, synthetic polymer compound such as polyvinyl alcohols, polypyrrolidones, acrylic resins (polyacrylic acid, acrylic acid-acrylonitrile copolymer, vinyl acetate-acrylic acid copolymer, and vinyl acetate-acrylic acid ester copolymer), styrene-acrylic acid system resins (styrene-acrylic acid copolymer, styrene-methacrylic acid copolymer, styrene-methacrylic acid-acrylic acid alkyl ester copolymer, styrene-α-methylstyrene-acrylic acid copolymer, styrene-α-methylstyrene-acrylic acid-acrylic acid alkyl ester copolymer, and styrene-vinyl acetate-acrylic acid copolymer), styrene-maleic acid system resins, vinyl acetate-fatty acid vinyl-ethylene copolymer resins and salts thereof. The configuration of the copolymer may be any one of a random type, a block type, and a graft type.

Examples of surfactant used as dispersant include anionic surfactant such as salts of fatty acid, higher alkyl dicarboxylate, higher fatty alcohol sulfates, and higher alkyl sulfonate, cationic surfactant such as amine salt of fatty acid and ammonium salt of fatty acid, and non-ionic surfactant such as polyoxyalkyl ethers, polyoxyalkyl esters, and sorbitan alkyl esters.

Among the above kinds of dispersant, water-insoluble resin is particularly preferable. Specifically, water-soluble resin which is configured by block copolymer resin of monomer with a hydrophobic group and monomer with a hydrophilic group, contains at least monomer with a salt formation group, and has solubility of less than 1 g with respect to 100 g of water at 25° C. after neutralization is preferable. Examples of the monomer with a hydrophobic group include methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate cyclohexy methacrylate, phenyl methacrylate, benzil methacrylate, and glycidyl methacrylate, vinyl esters such as vinyl acetate, vinyl cyanide compounds such as acrylonitrile and methacrylonitrile, aromatic vinyl monomers such as styrene, α-methylstyrene, vinyl toluene, 4-t-butylstyrene, chlorostyrene, vinylanisole, and vinylnaphthalene. One kind or two or more kinds among them can be used alone or in combination. Examples of the monomer with a hydrophilic group include polyethylene glycol monomethacrylate, polypropylene glycol monomethacrylate, and ethylene glycol.propylene glycol monomethacrylate, and one kind or two or more kinds among them can be used alone or in combination. Examples of the monomer with a salt formation group include acrylic acid, methacrylic acid, styrene carboxylic acid, and maleic acid, and one kind or two or more kinds among them can be used alone or in combination. Furthermore, it is also possible to use other kinds of monomer such as styrene system macro monomer with a polymerizable functional group and silicon system macro monomer.

The water-insoluble resin is preferably used as salt neutralized with tertiary amine such as ethylamine or trimethylamine or with alkali neutralizer such as lithium hydroxide, sodium hydroxide, potassium hydroxide, or ammonia. In addition, the weight-average molecular weight of the water-insoluble resin is preferably not less than about 10000 and not more than about 150000. In doing so, it is possible to more stably disperse the pigment.

The self-dispersion type pigment which can be dispersed and/or dissolved in the water without dispersant is manufactured by bonding (grafting) a dispersibility-imparting group or active species with a dispersibility-imparting group to the surface of the pigment by performing physical treatment or chemical treatment thereon, for example. Examples of the physical treatment include vacuum plasma treatment. In addition, examples of the chemical treatment include a wet oxidation method in which the surface of pigment is oxidized by oxidant in water and a method in which a carboxyl group is bonded via a phenyl group by bonding p-aminobenzoic acid to the surface of the pigment. Since the ink jet ink which contains the self-dispersion type pigment is not required to contain dispersant as described above, which is contained in ordinary pigment for dispersion, it is each to prepare ink with substantially no foaming due to a decrease in an antifoaming property caused by the dispersant, which is excellent in ejection stability. In addition, it is possible to suppress viscosity being significantly increased due to the dispersant and to thereby contain more pigment and sufficiently enhance printing concentration or facilitate handling. Since there are such advantages, the self-dispersion type pigment is effective for black ink jet ink which particularly requires high concentration, and black ink jet ink used as the ink jet ink according to the embodiment preferably include at least the self-dispersion type pigment which can be dispersed and/or dissolved in water without dispersant.

According to this embodiment, self-dispersion type pigment on which surface treatment by oxidation treatment with hypohalous acid and/or salt thereof or oxidation treatment by ozone is preferable in terms of a high chromogenic performance. In addition, commercially available self-dispersion type pigment can also be used, and examples of such commercially available products include Microjet CW-1 (product name; manufactured by Orient Chemical Industries Co., Ltd), CAB-O-JET200, CAB-O-JET300 (all of which are product names; manufactured by Cabot Corporation).

In addition, such pigment has a volume-average particle size in the ink within a range of not less than 50 nm and not more than 200 nm in view of securing ink reserving stability, preventing nozzle clogging, and the like. The volume-average particle size can be obtained by particle size measurement using Microtrac UPA 150 (manufactured by Micro Track Co., Ltd.) or particle size distribution measuring apparatus LPA3100 (manufactured by Otsuka Electronics Co., Ltd).

Such pigment is preferably contained within a range of not less than 6% by mass in the ink jet ink. If the content is less than 6% by mass, printing concentration (chromogenic property) is not sufficient in some cases. In addition, the upper limit of the content is not particularly limited, the content may be not more than 25% by mass, for example. If the content is more than 25% by mass, there is a case reliability deteriorates due to nozzle clogging, ejection instability, and the like.

First Resin A

The first resin (A) included in the ink jet ink according to the invention is resin which has a glass-transition temperature of less than 20° C. and a weight-average molecular weight of not more than 10000.

The first resin (A) is a constituent which contributes to image fixability to a recording medium. In addition, the first resin (A) is a constituent which enhances smoothness of the image surface and provides excellent glossiness to the image when used with the second resin (B) as will be described later.

The glass-transition temperature of the first resin (A) is less than 20° C. In doing so, it is possible to achieve excellent glossiness of an image. On the other hand, if the gloss-transition temperature of the first resin (A) is not less than the upper limit value, it is not possible to obtain smoothness of the image surface and sufficiently obtain glossiness. In addition, the first resin (A) cannot enter the inside of fiber configuring the recording medium, an anchor effect which is resulted from the first resin (A) entering the fiber is not sufficiently exhibited, and sufficient fixability cannot be obtained.

Although the glass-transition temperature of the first resin (A) is less than 20° C. as described above, the glass-transition temperature is preferably not more than 0° C. In doing so, the aforementioned effects of an aspect of the invention become more prominent.

In addition, the weight-average molecular weight of the first resin (A) is not more than 10000. In doing so, it is possible to achieve excellent glossiness of an image. On the other hand, if the weight-average molecular weight of the first resin (A) exceeds the upper limit, the smoothness of the image surface cannot be obtained, and sufficient glossiness cannot be obtained. In addition, the first resin (A) cannot enter the inside of the fiber configuring the recording medium, the anchor effect which is resulted from the first resin (A) entering the fiber is not sufficiently exhibited, and sufficient fixability cannot be obtained.

Although the weight-average molecular weight of the first resin (A) is not more than 10000 as described above, the weight-average molecular weight is preferably not more than 5000. In doing so, the aforementioned effects of an aspect of the invention become more prominent.

Although the first resin (A) is not particularly limited as long as the first resin (A) has the above property, the first resin (A) is preferably one kind selected from a group consisting of styrene acrylate copolymer and polyurethane resin. In doing so, it is possible to achieve more excellent glossiness of a recorded image.

The content of the first resin (A) is preferably not less than 0.5% by mass and not more than 3.0% by mass, and more preferably not less than 1.0% by mass and not more than 2.0% by mass. In doing so, it is possible to achieve more excellent fixability and glossiness.

Second Resin B

The second resin (B) included in the ink jet ink according to an aspect of the invention is resin which has a glass-transition temperature of not less than 23° C. By including such resin, it is possible to achieve excellent glossiness of a recorded image and enhance scratch resistance. If the glass-transition temperature is less than the lower limit value, it is not possible to obtain smoothness of the image surface and obtain sufficient glossiness. In addition, it is not possible to obtain sufficient scratch resistance.

Although the glass-transition temperature of the second resin (B) is not less than 23° C., the glass-transition temperature is preferably not less than 64° C. In doing so, it is possible to achieve excellent glossiness of a recorded image and further enhance the scratch resistance.

Although the second resin (B) is not particularly limited as long as the second resin (B) has the above property, the second resin (B) is preferably at least one kind selected from a group consisting of styrene acrylate copolymer and polyurethane resin. In doing so, it is possible to achieve more excellent glossiness of a recorded image and further effectively enhance the scratch resistance.

The weight-average molecular weight of the second resin (B) is preferably more than 10000, and more preferably not less than 20000. In doing so, it is possible to achieve excellent glossiness of a recorded image and further effectively enhance the scratch resistance.

The content of the second resin (B) is preferably not less than 1.0% by mass and not more than 4.0% by weight, and more preferably not less than 1.5% by mass and not more than 3.0% by mass. In doing so, it is possible to achieve more excellent fixability and glossiness.

Polyoxyalkylene Glycol Monoalkyl Ether C

The ink jet ink according to the invention includes at least one of the compound (C1) represented by the above Equation (1) and the compound (C2) represented by the above Equation (2).

The compound (C1) and the compound (C2) are constituents which functions as plasticizer for the first resin (A) and the second resin (B).

By including such a constituent, it is possible to effectively enhance the smoothness of the recorded image surface. As a result, it is possible to achieve more excellent glossiness of the recorded image. In addition, it is possible to provide flexibility to the recorded image and enhance fixability and scratch resistance.

Specific examples of the compound (C2) represented by the above Equation (2) include polyoxyethylene-2-ethylhexyl ether, polyoxyethylene oleyl ether, polyoxyethylene tridecyl ether, polyoxyethylene castor oil ether, polyoxyethylene cethyl ether, and polyoxyethylene tearyl ether.

The ration of the content of polyoxyalkylene glycol monoalkyl ether (C) with respect to the sum of the content of the first resin (A) and the second resin (B) is preferably not less than 0.10 and not more than 0.70, and more preferably not less than 0.20 and not more than 0.50. In doing so, it is possible to achieve more excellent glossiness of a recorded image.

If the compound (C1) is used as polyoxyalkylene glycol monoalkyl ether (C), the ratio of the content of the compound (C1) with respect to the sum of the content of the first resin (A) and the second resin (B) is preferably not less than 0.10 and not more than 0.70, and more preferably not less than 0.20 and not more than 0.50, and further more preferably not less than 0.30 and not more than 0.50. In doing so, it is possible to achieve more excellent glossiness of a recorded image.

If the compound (C2) is used as polyoxyalkylene glycol monoalkyl ether (C), the ratio of the content of the compound (C2) with respect to the sum of the content of the first resin (A) and the second resin (B) is preferably not less than 0.10 and not more than 0.70, more preferably not less than 0.20 and not more than 0.50, and further more preferably not less than 0.25 and not more than 0.50, and particularly preferably not less than 0.27 and not more than 0.40. In doing so, it is possible to achieve more excellent glossiness of a recorded image.

If the compound (C1) and the compound (C2) are used as polyoxyalkylene glycol monoalkyl ether (C), the ratio of the total content of the compound (C1) and the compound (C2) with respect to the sum of the content of the first resin (A) and the second resin (B) is preferably set to an appropriate value based on the aforementioned ranges. That is, the total content can be obtained by obtaining the ratio of the content of the compound (C1) and the compound (C2) in polyoxyalkylene glycol monoalkyl ether (C), obtaining values by multiplying the obtained content ratios by preferably ratios in the case of the compound (C1) and the compound (C2), and then adding the obtained values.

Specifically, the content of polyoxyalkylene glycol monoalkyl ether (C) is preferably not less than 0.5% by mass and not more than 2.4% by mass, and more preferably not less than 0.6% by mass and not more than 2.0% by mass. In doing so, it is possible to achieve more excellent fixability and glossiness.

Amphoteric Ion Compound

The ink jet ink according to an aspect of the invention may include an amphoteric ion compound in addition to the above constituents. By including the amphoteric ion compound, it is possible to more effectively suppress unevenness of image concentration and achieve more excellent glossiness of a recorded image.

The amphoteric ion compound is not particularly limited, and examples thereof include betaine series compound, amino acid, and derivatives thereof. More specifically, examples of the betaine series compound include amino acid N-trialkyl substitution such as glycine betaine (molecular weight: 117, also referred to as "trimethyl glycine"), γ-butyrobetaine (molecular weight: 145), homarine (molecular weight: 137), trigonelline (molecular weight: 137), carnitine (molecular weight: 161), homoserine betaine (molecular weight: 161), valine betaine (molecular weight: 159), lysine betaine (molecular weight: 188), ornithine betaine (molecular weight: 176), alanine betaine (molecular weight: 117), stachydrine (molecular weight: 185), and lutamic acid betaine (molecular weight: 189). In addition, Examples of amino acid include glycine (molecular weight: 75), alanine (molecular weight: 89), serine (molecular weight: 105), threonine (molecular weight: 119), valine (molecular weight: 117), methionine (molecular weight: 149), cysteine (molecular weight: 121), proline (molecular weight: 115), lycine (molecular weight: 146), histidine (molecular weight: 155), arginine and (molecular weight: 174) and derivatives thereof. Among them, a betaine series compound is preferable, and trimethyl glycine is more preferable from a viewpoint of reliably reducing expansion speed of the recoding medium after printing and preventing clogging of an ink ejecting nozzle. One kind or two or more kinds among the amphoteric ion compound may be used alone or in combination and may be synthesized by an ordinary method, or alternatively, commercially available product may be used. As a commercially available product, AMINOCOAT (manufactured by Asahi Kasei Chemicals Corporation) can be used as trimethyl glycine, for example.

In addition, the molecular weight of the amphoteric ion compound is preferably not less than 100 and not more than 250. In doing so, it is possible to more effectively suppress unevenness of image concentration and achieve more excellent glossiness of a recorded image. If the molecular weight is less than the lower limit value, a difference in viscosity at a temperature of not less than 10° C. and not more than 40° C. tends to increase, and the recording medium tends to be easily deformed and curled when dried after the image recording. On the other hand, if the molecular weight exceeds the upper limit, viscosity of the ink jet ink easily increases with respect to the addition amount of the compound in the ink jet ink, and it tends to be difficult to solve the deformation even after the recording medium is completely dried when deformation such as curling occurs in the recording medium after the image recording.

The content of the amphoteric ion compound is preferably not less than 5% by mass and not more than 40% by mass, and more preferably not less than 10% by mass and not more than 25% by mass. In doing so, it is possible to more effectively suppress unevenness of image concentration and achieve more excellent glossiness of a recorded image. In addition, it is possible to effectively suppress an expansion speed of the recording medium after the image recording. Moreover, it is possible to more effectively prevent ink ejecting nozzle from clogging in the ink jet.

Water

The ink jet ink may contain water from the viewpoint of safety, a handling property, and performances (a chromogenic property, a strike-through property, ink reliability).

In addition, the ink jet ink according to an aspect of the invention is preferably water-based ink jet ink which contains water as main solvent of ink from the viewpoint of safety and handling the ink, and it is preferable to use pure water or ultra-pure water such as ion-exchanged water, ultrafiltrated water, reverse permeation water, or distilled water. Particularly, it is preferable to use water sterilized by ultraviolet irradiation or addition of hydrogen peroxide from a point that it is possible to prevent generation of fungus and bacteria and reserve the ink over a long time. The ink jet ink preferably contains water at a rate of not less than 10% by mass and not more than 60% by mass with respect to the total amount thereof from the viewpoint of securing appropriate material values (viscosity and the like) of the ink and securing stability and reliability of the ink.

In addition, by setting the content of water included in the ink jet ink within the above range, the amount of water absorbed in cellulose in an ordinary paper is smaller than that in the case of the ink jet ink in the related art, and as a result, it is possible to suppress cellulose expansion which is considered to cause cockling and curling. Hereinafter, properties which are suitable for suppressing cockling and curling will be referred to as a "cockling property" and a "curling property", respectively.

Other Constituents

The ink jet ink according to the invention preferably includes at least one kind of moisturizer selected from a group consisting of moisturizer (X) and moisturizer (Y) described below from the viewpoint of appropriately maintaining balance of adequacy against clogging, adequacy against curling and cockling, adequacy against strike-through, and a viscosity property depending on a temperature of the ink. Here, the moisturizer (X) is at least one kind of compound selected from a group consisting of glycerin, 1,2,6-Hexanetriol, diethylene glycol, triethylene glycol, tetraethylene glycol, and dipropylene glycol, and the moisturizer (Y) is at least one kind of compound selected from a group consisting of trimethylolpropane and trimethylolethane.

In addition, the viscosity of the ink jet ink in a temperature range of not less than 10° C. and not more than 40° C. is influenced by temperature properties of colorant, the moisturizer, solvent, and the like included in the ink. Particularly, the moisturizer among them has a great influence, and the viscosity at 10° C. easily rises and the viscosity at 40° C. easily falls depending on a type, an additive amount, and a content ratio of the moisturizer. In the specification, a condition that a viscosity difference in a range of not less than 10° C. and not more than 40° C. will be described by an expression that a viscosity property depending on a temperature of the ink jet ink is excellent.

The moisturizer (X) is a substance which has an effect of suppressing clogging in particular. In addition, the moisturizer (X) is a substance which also has an effect of suppressing curling and cockling. However, the moisturizer (X) is a substance which is inferior in adequacy against strike-through due to excellent permeability to the recorded medium. From the viewpoint of effectively and reliably exhibiting the aforementioned effects, it is preferable to use glycerin and triethylene glycol as the moisturizer (X).

The moisturizer (Y) is a substance which has an effect of suppressing clogging in particular. In addition, the moisturizer (Y) is a substance which is excellent in the adequacy against strike-through since the substance has an effect of suppressing permeation. From the viewpoint of effectively and reliably exhibiting the effects, it is preferable to use trimethylolpropane as the moisturizer (Y).

The moisturizer (X) and (Y) more greatly influence on the viscosity property depending on a temperature as the content thereof in the ink jet ink increases, due to the property of the substances that the viscosity difference in a range of not less than 10° C. and not more than 40° C. is large, and the viscosity difference of the ink jet ink in a range of not less than 10° C. and not more than 40° C. becomes large.

When the ink jet ink according to the invention contains the above moisturizer (X) and/or the moisturizer (Z) in addition to the amphoteric ion compound, the total content of the amphoteric ion compound, (X), and (Y) is preferably not less than 10% by mass and not more than 40% by mass with respect to the whole amount of the ink jet ink.

In addition, the mass ratio of the content between the moisturizer (X) and (Y) and the amphoteric ion compound is preferably satisfy (X):(Y):(amphoteric ion compound)=(1.0):(0.1 to 1.0):(1.0 to 3.5) from the viewpoint of exhibiting the above effects of the moisturizer (X) and (Y) and the amphoteric ion compound in a well-balanced manner.

If the mass ratio of the moisturizer (Y) is set to be greater than the above range with respect to the moisturizer selected from the group (X) (referred to as "moisturizer (X)"; same is true in the following description), the adequacy against curling and the adequacy against cockling deteriorate. If the mass ratio of the moisturizer is set to be smaller, the adequacy against through-strike deteriorates. If the mass ratio of the amphoteric ion compound is set to be greater than the above range, the adequacy against clogging deteriorates. If the mass ratio of the amphoteric ion compound is set to be smaller, the adequacy against curling and the adequacy against cockling deteriorate.

The ink jet ink preferably includes water-soluble organic solvent for the purpose of preventing clogging in the vicinity of a nozzle of an ink jet head, appropriately controlling permeability and blooding of ink recorded medium, and providing an ink drying property. From the above viewpoint, the water-soluble organic solvent preferably contains 1,2-alkane diol and/or glycol ether. Specific examples of 1,2-alkane diol include 1,2-octanediol, 1,2-hexanediol, 1,2-pentanediol, and 4-methyl-1,2-pentanediol. In addition, specific examples of glycol ether include ethylene glycol monomethyl ether, ethylene glycol monoethyl ether, ethylene glycol monobuthyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-buthyl ether, ethylene glycol mono-t-buthyl ether, diethylene glycol mono-t-buthyl ether, triethylene glycol mono-n-buthyl ether, 1-methyl-1-methoxybutanol, propylene glycol monomethyl ether, propylene glycol monoethyl ether, propylene glycol mono-t-buthyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether. In addition to the above examples, it is also possible to use 2-pyrrolidone, N-methyl-2-pyrrolidone, or the like as the water-soluble organic solvent. One kind or two or more kinds of such water-soluble organic solvent can be used, and are preferably contained at a rate of not less than 1% by mass and not more than 50% by mass in the ink jet ink from the viewpoint of securing appropriate material values (viscosity and the like) of the ink and securing printing quality and reliability.

Furthermore, the ink jet ink preferably contains surface tension adjuster in order to control wettability of the ink recorded medium and obtain permeability of the recorded medium and printing stability in the ink jet recording method. Preferable examples of the surface tension adjuster include acetylenic glycol system surfactant and polyether-modified siloxanes. Examples of the acetylenic glycol system surfactant include Surfinol 420, 440, 465, 485, 104, and STG (all of which are manufactured by Air Products and Chemicals, Inc.; product names), Olfin PD-001, SPC, E1004, and E1010 (all of which are manufactured by Nisshin Chemical Co., Ltd.; product names), Acethylenol E00, E40, E100, and LH (all of which are manufactured by Kawaken Fine Chemicals Co., Ltd.). In addition, examples of polyether-modified siloxanes include BYK-346, 347, 348, and UV3530 (products of BYK Additives and Instruments). One kind or two or more kinds of the above surface tension adjuster can be used in the ink jet ink, and the surface tension adjuster is preferably included so as to adjust the surface tension of the ink jet ink to a range from 20 mN/m to 40 mN/m, and preferably included at a rate of not less than 0.1% by mass and not more than 3.0% by mass in the ink jet ink.

The ink jet ink according to the invention may include pH adjuster, complexing agent, anti-foaming agent, antioxidant, ultraviolet absorber, preservative, anti-fungal drug, and the like as necessary. As the pH adjuster, it is possible to use alkali hydroxide such as lithium hydroxide, potassium hydroxide, and sodium hydroxide and/or alkanolamine such as ammonia, triethanolamine, tripropanolamine, diethanolamine, and monoethanolamine. Particularly, it is preferable to include at least one kind of pH adjuster selected from hydroxide of alkali metal, ammonia, triethanolamine, and tripropanolamine. In addition, the pH of the ink jet ink according to the invention is adjusted to 6 to 10. If the pH is out of this range, the ink jet ink adversely affects the materials configuring an ink jet recording apparatus and tends to degrade a clogging recovery performance. In addition, examples of the complexing agent include amino polycarboxylic acid such as ethylenediaminetetraacetate and salts thereof (sodium salt or ammonium salt, for example).

A recorded object obtained by applying the aforementioned ink jet ink according to the invention to a recording medium by the ink jet method includes an image which is excellent in glossiness.

Ink Jet Recording Apparatus, Ink Jet Recording Method

Hereinafter, a description will be given of a preferable embodiment of an ink jet recording apparatus (liquid droplet ejecting apparatus).

FIGURE is a diagram schematically showing an example of an ink jet recording apparatus.

As shown in FIGURE, an ink jet recording apparatus 100 as a recording apparatus includes an ink jet head unit 190 for ejecting liquid droplet of the ink jet ink to a recording medium 101 and records an image, a platen unit 120 which is provided so as to face the ink jet head unit 190, an accommodating cassette 104 which accommodates the recording medium 101 before printing therein, a sheet supply roller 105 which supplies the recording medium 101 from the accommodating cassette 104, a pair of transport rollers (gate rollers) 140 for transporting the recording medium 101, a pair of first discharge rollers 150 and a pair of second exchange rollers 160 for transporting and discharging the recording medium 101, a sheet discharge cassette 106 which accommodates the recording medium 101 after printing therein, a control unit 111, and a position detecting sensor which detects a position of the supplied recording medium 101.

The ink jet head unit 190 is a printing mechanism which is provided with a plurality of ink jet heads corresponding to ink types and a carriage (not shown) for mounting the ink jet heads thereon. Each of the ink jet head is configured by a so-called line head in which multiple ink ejecting nozzles corresponding to an entire width are aligned in a width direction of the recording medium 101.

The platen unit 120 is for transporting the recording medium 101 along a transport surface 120A thereof. The transport surface 120A of the platen unit 120 is a flat surface which is perpendicular to the ink ejecting direction of the ink jet head unit 190. The transport surface 120A can sufficiently form a satisfactory image as long as the transport surface 120A has an enough area to keep a plane state which is perpendicular to an ink landing direction when the ink jet ink is landed on the recording medium 101.

In addition, the sheet supply roller 105 is a roller for sending the recording medium 101 in the accommodating cassette 104 to the transport rollers 140 and is driven by a motor 118 which is driven and controlled by the control unit 111.

The transport rollers 140 are a part of a transport mechanism, and are configured by a driving roller 140A and a driven roller 140B which is driven in contact with the driving roller 140A as a roller unit driven by a motor 116 driven and controlled by the control unit 111.

The first discharge rollers 150 are a part of the transport mechanism, and are configured by a driving roller 150A and a driven roller 150B which is driven in contact with the driving roller 150A as a roller unit which is driven by a motor 117 driven and controlled by the control unit 111.

In addition, the second discharge rollers 160 are a part of the transport mechanism, and are configured by a driving roller 160A and a driven roller 160B which is driven in contact with the driving roller 160A as a roller unit which is driven by a motor 119 driven and controlled by the control unit 111.

The control unit 111 includes a Central Processing Unit (CPU) which executes printing processing (recording processing) and various other kinds of processing, Random Access Memory (RAM) which stores print data (recording data) input from a host computer or the like via an interface or temporarily stores various kinds of data, a PROM and an Electrically Erasable Programmable Read-Only Memory (EEPROM) which accommodate a control program and the like for controlling the respective parts, and the like.

As the position detecting sensor, a reflection type photosensor as a combination of an infrared light emitting diode as a light emitting element and a phototransistor as a light receiving element is used, for example. The position detecting sensor is arranged in a sheet transport unit between the sheet supply roller 105 and the transport rollers 140 and detects a leading tip position of the transported recording medium 101 (presence of the recording medium 101), and the detection signal thereof is input to the control unit 111. The control unit 111 performs processing for driving and controlling the transport rollers 140 based on the detection signal relating to the leading position of the recording medium 101.

The recording medium 101 reaches the transport rollers 140 which are rotated by motor 116 driving by a drive signal from the control unit 111, and a leading end surface and a direction of the recording medium 101 are adjusted by bringing the leading end of the recording medium 101 into contact with the transport rollers 140, a paper is pinched between the driving roller 140A and the driven roller 140B, and fed and sent to the platen unit 120. Then, the recording medium 101, which has been transported to a printing area below the ink jet head unit 190 by the transport rollers 140, reaches the first discharge rollers 150 in a state where the recording medium 101 is pinched by the transport rollers 140. At this time, the motor 117 is driven by the drive signal from the control unit 111, the driven roller 150A is rotated, and the recording medium 101 is pinched and fed between the driving roller 150A and the driven roller 150B which is driven in contact with the driving roller 150A. In doing so, the recording medium 101 is transported and displaced in a state where the recording medium 101 is pinched between both the transport rollers 140 and the first discharge rollers 150, and printing based on print data is performed by ejecting ink droplets from nozzles of the ink jet head unit 190 while tension is applied to the recording medium 101 in the transport direction and the width direction, respectively.

An image is printed (recorded) on a recording medium 101 by executing predetermined processing on print data obtained from a host computer via an interface and stored on the RAM by the CPU in the control unit 111, outputting a drive signal to a head driver based on the processing data, inputting the drive signal to the ink jet head unit 190 via the head driver, driving a static actuator, to which the drive signal has been input, and ejecting ink from corresponding nozzles to the recording medium 101.

In addition, printing on the recording medium 101 is not limited to a static absorption scheme using the static actuator. That is, the ink jet recording scheme according to the embodiment is applicable as long as the ink jet ink is ejected from minute nozzles and the liquid droplets are made to land and adhere on the recording medium. A specific description will be given below.

A first method is based on a static absorption scheme in which an intense electric field is applied between a nozzle and an acceleration electrode place in front of the nozzle, the ink is sequentially ejected in a liquid droplet state, and recording is performed by providing a print information signal to a deflection electrodes while the liquid droplets fly between the deflection electrodes, or a scheme in which the ink droplets are ejected corresponding to print information without deflecting the ink droplets.

A second method is based on a scheme in which the ink jet ink in the form of liquid is pressurized by a small pump, and a nozzle is mechanically oscillated by a crystal oscillator, and ink droplets are forcibly ejected. The ejected liquid droplets are charged at the same time as the ejection, and recording is performed by providing a print information signal to the deflection electrodes while the liquid droplets fly between the deflection electrodes.

A third method is based on a scheme using a piezoelectric element in which pressure and print information are simultaneously applied to the ink jet ink in the form of liquid by a piezoelectric element and the ink droplets are ejected and recorded.

A fourth method is based on a scheme in which the volume of the ink jet ink in the form of liquid is rapidly expanded by an action of thermal energy, the ink jet ink is heated and foamed by a minute electrode in response to a print information signal, and the liquid droplets are ejected and recorded.

Any of the above schemes can be applied to the ink jet recording apparatus according to this embodiment.

The recording medium 101 after the printing is fed by the transport rollers 140 and the first discharge rollers 150.

Thereafter, the recording medium 101 is fed only by the second discharger rollers 160 after passing through the first discharge rollers 150, and is accommodated in the sheet discharge cassette 106.

Although the above description was given of the preferable embodiment of the invention, the invention is not limited thereto.

EXAMPLES

Next, a description will be given of specific examples of the invention.

Example A

1A. Ink Jet Ink

Examples 1A to 23A and Comparative Examples 1A to 5A

Ink jet ink with compositions as shown in Table 1 was produced and prepared by an ordinary method.

In Table 1, yellow pigment dispersion liquid (self-dispersion type, manufactured by Cabot Corporation, product name: "CAB-O-JET270Y") is represented as Y1a, yellow pigment dispersion liquid (resin dispersion type, the pigment dispersion liquid Y1 disclosed in the paragraph 0047 in the specification of JP-A-2010-248477 using the resin dispersion type pigment disclosed in the paragraph 0026 in the specification) is represented as Y2a, magenta pigment dispersion liquid (self-dispersion type, manufactured by Cabot Corporation, product name "CAB-O-JET260M") is represented as M1a, and cyan pigment dispersion liquid (self-dispersion type, manufactured by Cabot Corporation, product name "CAB-O-JET250C") is represented as C1a.

In addition, the acrylic ester polymer as the first resin (A) (Tg: −60° C., weight-average molecular weight: 2000, manufactured by Toagosei Co., Ltd.) is represented as A1a, styrene acrylate copolymer (Tg: −18° C., weight-average molecular weight: 2000, manufactured by Nippon Paint Co., Ltd.) is represented as A2a, styrene acrylate copolymer (Tg: −5° C., weight-average molecular weight: 2800, manufactured by BASF Japan Ltd.) is represented as A3a, styrene acrylate copolymer (Tg: 16° C., weight-average molecular weight: 4500, manufactured by BASF Japan Ltd.) is represented as A4a, and styrene acrylate copolymer (Tg: −9° C., weight-average molecular weight: 9300, manufactured by BASF Japan Ltd.) is represented as A5a.

In addition, styrene acrylate copolymer (Tg: 16° C., weight-average molecular weight: 13000, manufactured by BASF Japan Ltd.) is represented as A'1a.

In addition, styrene acrylate copolymer as the second resin (B) (Tg: 32° C., weight-average molecular weight: 17000, manufactured by BASF Japan Ltd.) is represented as B1a, styrene acrylate copolymer (Tg: 49° C., weight-average molecular weight: 30000, manufactured by BASF Japan Ltd.) is represented as B2a, styrene acrylate copolymer (Tg: 65° C., weight-average molecular weight: 90000, manufactured by BASF Japan Ltd.) is represented as B3a, styrene acrylate copolymer (Tg: 75° C., weight-average molecular weight: 15000, manufactured by BASF Japan Ltd.) is represented as B4a, and styrene acrylate copolymer (Tg: 80° C., weight-average molecular weight: 290000, manufactured by BASF Japan Ltd.) is represented as B5a.

FINESURFE 560 (manufactured by Aoki Oil Industrial Co., Ltd.) as the compound (C1) represented by the above Equation (1) is represented as C1a, and FINESURFE 9010 (manufactured by Aoki Oil Industrial Co., Ltd.) is represented as C2a.

The respective ink was excellent in ejection stability.

TABLE 1

| | Pigment | | Resin constituent | | | | Compound (C) | | AMINOCOAT | Glycerin | Triethylene glycol | Trimethylol- propane |
|---|---|---|---|---|---|---|---|---|---|---|---|---|
| | Type | Content [mass %] | Type | Content [mass %] | Type | Content [mass %] | Type | Content [mass %] | (trimethylglycine) [mass %] | [mass %] | [mass %] | [mass %] |
| Ex. 1A | Y1a | 8.00 | A1a | 1.00 | B4a | 2.00 | C1a | 1.00 | 12.00 | 4.00 | 2.00 | 4.00 |
| Ex. 2A | Y2a | 8.00 | A1a | 1.00 | B4a | 2.00 | C1a | 1.00 | 12.00 | 4.00 | 2.00 | 4.00 |
| Ex. 3A | M1a | 10.00 | A1a | 1.00 | B4a | 2.00 | C1a | 1.00 | 12.00 | 4.00 | 2.00 | 4.00 |
| Ex. 4A | C1a | 6.00 | A1a | 1.00 | B4a | 2.00 | C1a | 1.00 | 12.00 | 4.00 | 2.00 | 4.00 |
| Ex. 5A | M1a | 10.00 | A1a | 1.00 | B3a | 2.00 | C1a | 1.00 | 12.00 | 4.00 | 2.00 | 4.00 |
| Ex. 6A | Y1a | 7.00 | A1a | 1.00 | B4a | 2.00 | C1a | 1.00 | 12.00 | 4.00 | 2.00 | 4.00 |
| Ex. 7A | Y1a | 12.00 | A1a | 1.00 | B4a | 2.00 | C1a | 1.00 | 12.00 | 4.00 | 2.00 | 4.00 |
| Ex. 8A | Y1a | 8.00 | A1a | 0.50 | B4a | 2.00 | C1a | 1.00 | 12.00 | 4.00 | 2.00 | 4.00 |
| Ex. 9A | Y1a | 8.00 | A1a | 2.00 | B4a | 2.00 | C1a | 1.00 | 12.00 | 4.00 | 2.00 | 4.00 |
| Ex. 10A | Y1a | 8.00 | A2a | 1.00 | B4a | 2.00 | C1a | 1.00 | 12.00 | 4.00 | 2.00 | 4.00 |
| Ex. 11A | Y1a | 8.00 | A3a | 1.00 | B4a | 2.00 | C1a | 1.00 | 12.00 | 4.00 | 2.00 | 4.00 |
| Ex. 12A | Y1a | 8.00 | A4a/ A5a | 1.00/ 1.00 | B4a | 2.00 | C1a | 1.00 | 12.00 | 4.00 | 2.00 | 4.00 |
| Ex. 13A | Y1a | 8.00 | A1a | 1.00 | B4a | 1.00 | C1a | 1.00 | 12.00 | 4.00 | 2.00 | 4.00 |
| Ex. 14A | Y1a | 8.00 | A1a | 1.00 | B4a | 4.00 | C1a | 1.00 | 12.00 | 4.00 | 2.00 | 4.00 |
| Ex. 15A | Y1a | 8.00 | A2a | 1.00 | B1a | 2.00 | C1a | 1.00 | 12.00 | 4.00 | 2.00 | 4.00 |
| Ex. 16A | Y1a | 8.00 | A2a | 1.00 | B2a | 2.00 | C1a | 1.00 | 12.00 | 4.00 | 2.00 | 4.00 |
| Ex. 17A | Y1a | 8.00 | A2a | 1.00 | B5a | 2.00 | C1a | 1.00 | 12.00 | 4.00 | 2.00 | 4.00 |
| Ex. 18A | Y1a | 8.00 | A1a | 1.00 | B4a | 2.00 | C1a | 0.50 | 12.00 | 4.00 | 2.00 | 4.00 |
| Ex. 19A | Y1a | 8.00 | A1a | 1.00 | B4a | 2.00 | C1a | 2.00 | 12.00 | 4.00 | 2.00 | 4.00 |
| Ex. 20A | Y1a | 8.00 | A1a | 1.00 | B4a | 2.00 | C2a | 1.00 | 12.00 | 4.00 | 2.00 | 4.00 |
| Ex. 21A | Y1a | 8.00 | A1a | 0.50 | B4a | 2.00 | C1a | 0.60 | 12.00 | 4.00 | 2.00 | 4.00 |
| Ex. 22A | Y1a | 8.00 | A1a | 1.50 | B4a | 2.00 | C1a | 1.20 | 12.00 | 4.00 | 2.00 | 4.00 |
| Ex. 23A | Y1a | 8.00 | A1a | 3.00 | B4a | 2.00 | C1a | 2.40 | 12.00 | 4.00 | 2.00 | 4.00 |
| Comp. Ex. 1A | Y1a | 8.00 | — | — | B4a | 2.00 | C1a | 1.00 | 12.00 | 4.00 | 2.00 | 4.00 |
| Comp. Ex. 2A | Y1a | 8.00 | A1a | 1.00 | — | — | C1a | 1.00 | 12.00 | 4.00 | 2.00 | 4.00 |
| Comp. Ex. 3A | Y1a | 8.00 | A1a | 1.00 | B4a | 2.00 | — | — | 12.00 | 4.00 | 2.00 | 4.00 |
| Comp. Ex. 4A | Y1a | 4.00 | A'1a | 1.00 | B4a | 2.00 | C1a | 1.00 | 12.00 | 4.00 | 2.00 | 4.00 |
| Comp. Ex. 5A | Y1a | 8.00 | A'1a | 1.00 | B4a | 2.00 | C1a | 1.00 | 12.00 | 4.00 | 2.00 | 4.00 |

| | 2-pyrrolidone [mass %] | Triethyleneglycol monobuthylether [mass %] | 1,2-hexane diol [mass %] | Surfinol 465 [mass %] | Olfin E1010 [mass %] | Tripropanol- amine [mass %] | Ethylenediamine- tetraacetate [mass %] | Ion exchanged water [mass %] |
|---|---|---|---|---|---|---|---|---|
| Ex. 1A | 2.00 | 2.00 | 4.00 | 0.50 | 0.50 | 0.50 | 0.01 | 56.49 |
| Ex. 2A | 2.00 | 2.00 | 4.00 | 0.50 | 0.50 | 0.50 | 0.01 | 56.49 |
| Ex. 3A | 2.00 | 2.00 | 4.00 | 0.50 | 0.50 | 0.50 | 0.01 | 54.49 |
| Ex. 4A | 2.00 | 2.00 | 4.00 | 0.50 | 0.50 | 0.50 | 0.01 | 58.49 |
| Ex. 5A | 2.00 | 2.00 | 4.00 | 0.50 | 0.50 | 0.50 | 0.01 | 54.49 |
| Ex. 6A | 2.00 | 2.00 | 4.00 | 0.50 | 0.50 | 0.50 | 0.01 | 57.49 |
| Ex. 7A | 2.00 | 2.00 | 4.00 | 0.50 | 0.50 | 0.50 | 0.01 | 52.49 |
| Ex. 8A | 2.00 | 2.00 | 4.00 | 0.50 | 0.50 | 0.50 | 0.01 | 56.99 |
| Ex. 9A | 2.00 | 2.00 | 4.00 | 0.50 | 0.50 | 0.50 | 0.01 | 55.49 |
| Ex. 10A | 2.00 | 2.00 | 4.00 | 0.50 | 0.50 | 0.50 | 0.01 | 56.49 |
| Ex. 11A | 2.00 | 2.00 | 4.00 | 0.50 | 0.50 | 0.50 | 0.01 | 56.49 |
| Ex. 12A | 2.00 | 2.00 | 4.00 | 0.50 | 0.50 | 0.50 | 0.01 | 55.49 |
| Ex. 13A | 2.00 | 2.00 | 4.00 | 0.50 | 0.50 | 0.50 | 0.01 | 57.49 |
| Ex. 14A | 2.00 | 2.00 | 4.00 | 0.50 | 0.50 | 0.50 | 0.01 | 54.49 |
| Ex. 15A | 2.00 | 2.00 | 4.00 | 0.50 | 0.50 | 0.50 | 0.01 | 56.49 |
| Ex. 16A | 2.00 | 2.00 | 4.00 | 0.50 | 0.50 | 0.50 | 0.01 | 56.49 |
| Ex. 17A | 2.00 | 2.00 | 4.00 | 0.50 | 0.50 | 0.50 | 0.01 | 56.49 |
| Ex. 18A | 2.00 | 2.00 | 4.00 | 0.50 | 0.50 | 0.50 | 0.01 | 56.99 |
| Ex. 19A | 2.00 | 2.00 | 4.00 | 0.50 | 0.50 | 0.50 | 0.01 | 55.49 |
| Ex. 20A | 2.00 | 2.00 | 4.00 | 0.50 | 0.50 | 0.50 | 0.01 | 56.49 |
| Ex. 21A | 2.00 | 2.00 | 4.00 | 0.50 | 0.50 | 0.50 | 0.01 | 57.39 |
| Ex. 22A | 2.00 | 2.00 | 4.00 | 0.50 | 0.50 | 0.50 | 0.01 | 55.79 |
| Ex. 23A | 2.00 | 2.00 | 4.00 | 0.50 | 0.50 | 0.50 | 0.01 | 53.09 |
| Comp. Ex. 1A | 2.00 | 2.00 | 4.00 | 0.50 | 0.50 | 0.50 | 0.01 | 57.49 |

TABLE 1-continued

| | | | | | | | | |
|---|---|---|---|---|---|---|---|---|
| Comp. Ex. 2A | 2.00 | 2.00 | 4.00 | 0.50 | 0.50 | 0.50 | 0.01 | 58.49 |
| Comp. Ex. 3A | 2.00 | 2.00 | 4.00 | 0.50 | 0.50 | 0.50 | 0.01 | 57.49 |
| Comp. Ex. 4A | 2.00 | 2.00 | 4.00 | 0.50 | 0.50 | 0.50 | 0.01 | 60.49 |
| Comp. Ex. 5A | 2.00 | 2.00 | 4.00 | 0.50 | 0.50 | 0.50 | 0.01 | 56.49 |

2A. Image Recording

The ink jet ink in the respective examples and the respective comparative examples was set in an ink jet recording apparatus as shown in FIGURE.

Thereafter, solid printing was performed on a photo paper by EPSON as a recording medium.

3A. Evaluation

Evaluation on Gloss Level

An ink jet printer PX-A550 (manufactured by Seiko Epson Corporation) was filled with the respective prepared ink, and a 100% duty patch pattern was recorded on a recording medium (photo paper <glossy> manufactured by Seiko Epson Corporation). The obtained sample was left in an environment at a normal temperature and a normal humidity (temperature: 20° C., humidity: 65%) for one hour. After leaving the sample, glossiness (gloss level) at 20° in the respective patch part was measured by using a gloss level measuring apparatus GM-268 (manufactured by Konica Minolta Holdings, Inc.), and the gloss value (gloss level) was evaluated based on the following criteria.
A: The gloss level is not less than 150% of recording paper gloss at a regular reflection angle of 20°.
B: The gloss level is not less than 100% and less than 150% of recording paper gloss at a regular reflectance angle of 20°.
C: The gloss level is not less than 50% and less than 100% of recording paper gloss at a regular reflection angle of 20° (acceptable).
D: The gloss level is less than 50% of recording paper gloss at a regular reflection angle of 20° (unacceptable).
Evaluation on OD Value, Chromogenic Property The ink jet ink in the respective examples and the respective comparative examples was set in the ink jet recording apparatus as shown in FIGURE.

Thereafter, solid printing was performed on an ordinary paper (Xerox-P sheet) as a recording medium.

Od values of the printed solid image were measured five times (at five locations) by using a Gretag spectrophotometer (manufactured by GretagMacbeth LLC). Then, an additive average value of the respective ink jet ink in the examples and the comparative examples was obtained, and optical density values (OD values) of the calculated average OD values were evaluated based on the following determination criteria.
A: The OD value is not less than 1.3.
B: The OD value is not less than 1.2 and less than 1.3. C: The OD value is not less than 1.1 and less than 1.2 (acceptable).
D: The OD value is less than 1.1 (unacceptable).
Cloth Scrubbing Test, Fixability Evaluation 1

An ink jet printer PX-A550 (manufactured by Seiko Epson Corporation) was filled with the respective prepared ink, and a 100% duty patch pattern was recorded on a recording medium (photo paper <glossy> manufactured by Seiko Epson Corporation). The obtained sample was left in an environment at a normal temperature and a normal humidity (temperature: 20° C., humidity: 65%) for one hour. After leaving the sample, a patch part was wiped at a speed of 1 cm/second so as to be scrubbed with a surface of Bemcot M-3 (manufactured by Asahi Kasei Corporation) as scrubbing cloth while the scrubbing cloth was pressurized by a weight with a diameter of 10 mm and a load of 200 g. The respective patch parts and the scrubbing surface of Bemcot after the scrubbing were visually observed, and determination was made based on the following evaluation criteria.
A: Scratch by the cloth scrubbing was not observed at all.
B: Although scratch was observed, no contamination was observed on the surface of the cloth.
C: Scratch was observed, and a small amount of contamination was observed on the surface of the cloth (acceptable).
D: Scratch was observed, and a large amount of contamination was observed on the surface of the cloth (unacceptable).
Line Marker Test, Fixability Evaluation 2

An ink jet printer PX-A550 (manufactured by Seiko Epson Corporation) was filled with the respective prepared ink, and a 24-point character pattern was recorded on a recording medium (Xerox 4200). The obtained sample was left in an environment at a normal temperature and a normal humidity (temperature: 20° C., humidity: 65%) for twenty four hour. After leaving the sample, the printed character was scrubbed by using a water-based yellow highlighter ZEBRA PEN2 (registered trademark) manufactured by Zebra Co., Ltd. at a writing pressure of 300 g/15 mm. The recorded character after the scrubbing was visually observed, and determination was made based on the following evaluation criteria.
A: No contamination was observed at all after a same part was scrubbed twice.
B: Although no contamination was observed after the first scrubbing, contamination was observed after the second scrubbing.
C: A small amount of contamination was observed after the first scrubbing (acceptable).
D: A large amount of contamination was observed after the first scrubbing (unacceptable).
Permanent Curl Test Solid printing at a duty of 100% was performed on an ordinary paper (Xerox 4200 manufactured by Xerox Corporation) as a recording medium by using the ink jet recording apparatus as shown in FIGURE. The obtained recorded objects were left for twenty four hours and visually observed, and evaluation was made based on the following determination criteria.
A: An amount of curl after leaving the recorded object for twenty four hours is less than 10 mm and is acceptable.
B: An amount of curl after leaving the recorded object for twenty four hours is not less than 10 mm and less than 30 mm and is acceptable.
C: An amount of curl after leaving the recorded object for twenty four hours is not less than 30 mm and less than 50 mm and is acceptable.
D: An amount of curl after leaving the recorded object for twenty four hours is not less than 50 mm and is not acceptable.

The results will be shown in Table 2. In addition, a content ratio of the compound (C1) with respect to the sum of the content of the first resin (A) and the second resin (B) (these will be collectively referred to as a "resin constituent" in the table).

TABLE 2

| | Content ratio of compound (C) with respect to resin constituent | gloss level | OD value | Fixation strength 1 | Fixation strength 2 | Permanent curl |
|---|---|---|---|---|---|---|
| Example 1A | 0.33 | A | B | A | A | A |
| Example 2A | 0.33 | A | B | A | A | A |
| Example 3A | 0.33 | B | B | A | A | A |
| Example 4A | 0.33 | A | B | A | A | B |
| Example 5A | 0.33 | A | B | A | A | A |
| Example 6A | 0.33 | A | B | A | A | B |
| Example 7A | 0.33 | B | A | A | A | A |
| Example 8A | 0.40 | A | B | A | B | A |
| Example 9A | 0.25 | B | B | A | A | A |
| Example 10A | 0.33 | A | B | A | A | A |
| Example 11A | 0.33 | A | B | A | A | A |
| Example 12A | 0.25 | B | B | A | A | A |
| Example 13A | 0.50 | A | B | B | A | B |
| Example 14A | 0.20 | B | B | A | A | A |
| Example 15A | 0.33 | A | B | A | A | A |
| Example 16A | 0.33 | A | B | A | A | A |
| Example 17A | 0.33 | B | B | A | A | A |
| Example 18A | 0.17 | B | B | B | A | A |
| Example 19A | 0.67 | B | B | A | A | A |
| Example 20A | 0.33 | A | B | A | A | A |
| Example 21A | 0.24 | B | B | B | B | B |
| Example 22A | 0.34 | A | B | A | A | B |
| Example 23A | 0.48 | A | B | A | A | A |
| Comparative Example 1A | — | C | B | B | D | B |
| Comparative Example 2A | — | D | B | D | C | B |
| Comparative Example 3A | — | D | B | C | B | B |
| Comparative Example 4A | — | A | D | A | A | C |
| Comparative Example 5A | — | C | B | C | D | A |

As is obvious from Table 2, it was possible to record images, which are excellent in glossiness, with the ink jet ink according to the invention. In addition, the images recorded with the ink jet ink according to the invention were also excellent in the chromogenic property and the fixability. According to the invention, it was possible to suppress occurrence of curl and obtain recorded objects with high quality. On the other hand, it was not possible to achieve satisfactory results in the respective comparative examples.

Example B

1B. Ink Jet Ink

Examples 1B to 25B and Comparative Examples 1B to 5B

Ink jet ink with compositions as shown in Table 3 was produced and prepared by an ordinary method.

In Table 3, yellow pigment dispersion liquid (self-dispersion type, manufactured by Cabot Corporation, product name: "CAB-O-JET270Y") is represented as Y1b, yellow pigment dispersion liquid (resin dispersion type, the pigment dispersion liquid Y1 disclosed in the paragraph 0047 in the specification of JP-A-2010-248477 using the resin dispersion type pigment disclosed in the paragraph 0026 in the specification) is represented as Y2b, magenta pigment dispersion liquid (self-dispersion type, manufactured by Cabot Corporation, product name "CAB-O-JET260M") is represented as M1b, and cyan pigment dispersion liquid (self-dispersion type, manufactured by Cabot Corporation, product name "CAB-O-JET250C") is represented as C1b.

In addition, the acrylic ester polymer as the first resin (A) (Tg: −60° C., weight-average molecular weight: 2000, manufactured by Toagosei Co., Ltd.) is represented as A1b, styrene acrylate copolymer (Tg: −18° C., weight-average molecular weight: 2000, manufactured by Nippon Paint Co., Ltd.) is represented as A2b, styrene acrylate copolymer (Tg: −5° C., weight-average molecular weight: 2800, manufactured by BASF Japan Ltd.) is represented as A3b, styrene acrylate copolymer (Tg: 16° C., weight-average molecular weight: 4500, manufactured by BASF Japan Ltd.) is represented as A4b, and styrene acrylate copolymer (Tg: −9° C., weight-average molecular weight: 9300, manufactured by BASF Japan Ltd.) is represented as A5b.

In addition, styrene acrylate copolymer (Tg: 16° C., weight-average molecular weight: 13000, manufactured by BASF Japan Ltd.) is represented as A'1b.

In addition, styrene acrylate copolymer as the second resin (B) (Tg: 32° C., weight-average molecular weight: 17000, manufactured by BASF Japan Ltd.) is represented as B1b, styrene acrylate copolymer (Tg: 49° C., weight-average molecular weight: 30000, manufactured by BASF Japan Ltd.) is represented as B2b, styrene acrylate copolymer (Tg: 65° C., weight-average molecular weight: 90000, manufactured by BASF Japan Ltd.) is represented as B3b, styrene acrylate copolymer (Tg: 75° C., weight-average molecular weight: 15000, manufactured by BASF Japan Ltd.) is represented as Bob, and styrene acrylate copolymer (Tg: 80° C., weight-average molecular weight: 290000, manufactured by BASF Japan Ltd.) is represented as B5b.

Polyoxyethylene-2-ethylhexylether (product name: "Newcol 1004" manufactured by Nippon Nyukazai Co., Ltd., ethylene oxide 4 mol adduct) as the compound (C2) represented by the above Equation (2) is represented as C1b, polyoxyethylene-2-ethylhexylether (product name: "Newcol 1008" manufactured by Nippon Nyukazai Co., Ltd., ethylene oxide 8 mol adduct) is represented as C2b, polyoxyethylene oleyl ester (product name: "Newcol 1204" manufactured by Nippon Nyukazai Co., Ltd., ethylene oxide 4 mol adduct) is represented as C3b, and polyoxyethylene tearyl ether (product name: "Newcol 1820" manufactured by Nippon Nyukazai Co., Ltd, ethylene oxide 20 mol adduct) is represented as C4b.

In addition, the respective ink was excellent in ejection stability.

TABLE 3

| | Pigment | | Resin constituent | | | | Compound (C) | | AMINOCOAT | glycerin [mass %] | Triethylene glycol [mass %] | trimethylol-propane [mass %] |
|---|---|---|---|---|---|---|---|---|---|---|---|---|
| | Type | Content [mass %] | Type | Content [mass %] | Type | Content [mass %] | Type | Content [mass %] | (trimethylglycine) [mass %] | | | |
| Ex. 1B | Y1b | 8.00 | A1b | 1.00 | B4b | 2.00 | C1b | 1.00 | 12.00 | 4.00 | 2.00 | 4.00 |
| Ex. 2B | Y2b | 8.00 | A1b | 1.00 | B4b | 2.00 | C1b | 1.00 | 12.00 | 4.00 | 2.00 | 4.00 |
| Ex. 3B | M1b | 10.00 | A1b | 1.00 | B4b | 2.00 | C1b | 1.00 | 10.00 | 4.00 | 2.00 | 4.00 |
| Ex. 4B | C1b | 6.00 | A1b | 1.00 | B4b | 2.00 | C1b | 1.00 | 8.00 | 4.00 | 2.00 | 4.00 |
| Ex. 5B | M1b | 10.00 | A1b | 1.00 | B3b | 2.00 | C1b | 1.00 | 12.00 | 4.00 | 2.00 | 4.00 |
| Ex. 6B | Y1b | 7.00 | A1b | 1.00 | B4b | 2.00 | C1b | 1.00 | 12.00 | 4.00 | 2.00 | 4.00 |
| Ex. 7B | Y1b | 12.00 | A1b | 1.00 | B4b | 2.00 | C1b | 1.00 | 12.00 | 4.00 | 2.00 | 4.00 |
| Ex. 8B | Y1b | 8.00 | A1b | 0.50 | B4b | 2.00 | C1b | 1.00 | 12.00 | 4.00 | 2.00 | 4.00 |
| Ex. 9B | Y1b | 8.00 | A1b | 2.00 | B4b | 2.00 | C1b | 1.00 | 10.00 | 4.00 | 2.00 | 4.00 |
| Ex. 10B | Y1b | 8.00 | A2b | 0.50 | B4b | 3.00 | C1b | 1.00 | 12.00 | 4.00 | 2.00 | 4.00 |
| Ex. 11B | Y1b | 8.00 | A3b | 0.50 | B4b | 2.00 | C1b | 1.00 | 8.00 | 4.00 | 2.00 | 4.00 |
| Ex. 12B | Y1b | 8.00 | A4b/A5b | 1.00/1.00 | B4b | 2.00 | C1b | 1.00 | 12.00 | 4.00 | 2.00 | 4.00 |
| Ex. 13B | Y1b | 8.00 | A1b | 1.00 | B4b | 1.00 | C1b | 1.00 | 12.00 | 4.00 | 2.00 | 4.00 |
| Ex. 14B | Y1b | 8.00 | A1b | 1.00 | B4b | 4.00 | C1b | 1.00 | 10.00 | 4.00 | 2.00 | 4.00 |
| Ex. 15B | Y1b | 8.00 | A2b | 1.00 | B1b | 2.00 | C1b | 1.00 | 12.00 | 4.00 | 2.00 | 4.00 |
| Ex. 16B | Y1b | 8.00 | A2b | 1.00 | B2b | 2.00 | C1b | 1.00 | 8.00 | 4.00 | 2.00 | 4.00 |
| Ex. 17B | Y1b | 8.00 | A2b | 1.00 | B5b | 2.00 | C1b | 1.00 | 12.00 | 4.00 | 2.00 | 4.00 |
| Ex. 18B | Y1b | 8.00 | A1b | 1.00 | B4b | 2.00 | C1b | 0.50 | 12.00 | 4.00 | 2.00 | 4.00 |
| Ex. 19B | Y1b | 8.00 | A1b | 1.00 | B4b | 2.00 | C1b | 2.00 | 10.00 | 4.00 | 2.00 | 4.00 |
| Ex. 20B | Y1b | 8.00 | A1b | 1.00 | B4b | 2.00 | C2b | 1.00 | 12.00 | 4.00 | 2.00 | 4.00 |
| Ex. 21B | Y1b | 8.00 | A1b | 1.00 | B4b | 2.00 | C3b | 1.00 | 8.00 | 4.00 | 2.00 | 4.00 |
| Ex. 22B | Y1b | 8.00 | A1b | 1.00 | B4b | 2.00 | C4b | 1.00 | 12.00 | 4.00 | 2.00 | 4.00 |
| Ex. 23B | Y1b | 8.00 | A1b | 0.50 | B4b | 2.00 | C1b | 0.60 | 12.00 | 4.00 | 2.00 | 4.00 |
| Ex. 24B | Y1b | 8.00 | A1b | 1.50 | B4b | 2.00 | C1b | 1.20 | 12.00 | 4.00 | 2.00 | 4.00 |
| Ex. 25B | Y1b | 8.00 | A1b | 3.00 | B4b | 2.00 | C1b | 2.40 | 12.00 | 4.00 | 2.00 | 4.00 |
| Comp. Ex. 1B | Y1b | 8.00 | — | — | B4b | 2.00 | C1b | 1.00 | 12.00 | 4.00 | 2.00 | 4.00 |
| Comp. Ex. 2B | Y1b | 8.00 | A1b | 1.00 | — | — | C1b | 1.00 | 12.00 | 4.00 | 2.00 | 4.00 |
| Comp. Ex. 3B | Y1b | 8.00 | A1b | 1.00 | B4b | 2.00 | — | — | 12.00 | 4.00 | 2.00 | 4.00 |
| Comp. Ex. 4B | Y1b | 4.00 | A'1b | 1.00 | B4b | 2.00 | C1b | 1.00 | 12.00 | 4.00 | 2.00 | 4.00 |
| Comp. Ex. 5B | Y1b | 8.00 | A'1b | 1.00 | B4b | 2.00 | C1b | 1.00 | 12.00 | 4.00 | 2.00 | 4.00 |

| | 2-pyrrolidone [mass %] | Triethylene glycol monobuthylether [mass %] | 1,2-hexane diol [mass %] | Surfinol 465 [mass %] | Olfin E1010 [mass %] | Tripropanol-amine [mass %] | Ethylenediamine-tetraacetate [mass %] | Ion exchanged water [mass %] |
|---|---|---|---|---|---|---|---|---|
| Ex. 1B | 2.00 | 2.00 | 4.00 | 0.50 | 0.50 | 0.50 | 0.01 | 56.49 |
| Ex. 2B | 2.00 | 2.00 | 4.00 | 0.50 | 0.50 | 0.50 | 0.01 | 56.49 |
| Ex. 3B | 2.00 | 2.00 | 4.00 | 0.50 | 0.50 | 0.50 | 0.01 | 56.49 |
| Ex. 4B | 2.00 | 2.00 | 4.00 | 0.50 | 0.50 | 0.50 | 0.01 | 62.49 |
| Ex. 5B | 2.00 | 2.00 | 4.00 | 0.50 | 0.50 | 0.50 | 0.01 | 54.49 |
| Ex. 6B | 2.00 | 2.00 | 4.00 | 0.50 | 0.50 | 0.50 | 0.01 | 57.49 |
| Ex. 7B | 2.00 | 2.00 | 4.00 | 0.50 | 0.50 | 0.50 | 0.01 | 52.49 |
| Ex. 8B | 2.00 | 2.00 | 4.00 | 0.50 | 0.50 | 0.50 | 0.01 | 56.99 |
| Ex. 9B | 2.00 | 2.00 | 4.00 | 0.50 | 0.50 | 0.50 | 0.01 | 57.49 |
| Ex. 10B | 2.00 | 2.00 | 4.00 | 0.50 | 0.50 | 0.50 | 0.01 | 56.49 |
| Ex. 11B | 2.00 | 2.00 | 4.00 | 0.50 | 0.50 | 0.50 | 0.01 | 55.99 |
| Ex. 12B | 2.00 | 2.00 | 4.00 | 0.50 | 0.50 | 0.50 | 0.01 | 60.99 |
| Ex. 13B | 2.00 | 2.00 | 4.00 | 0.50 | 0.50 | 0.50 | 0.01 | 57.49 |
| Ex. 14B | 2.00 | 2.00 | 4.00 | 0.50 | 0.50 | 0.50 | 0.01 | 56.49 |
| Ex. 15B | 2.00 | 2.00 | 4.00 | 0.50 | 0.50 | 0.50 | 0.01 | 56.49 |
| Ex. 16B | 2.00 | 2.00 | 4.00 | 0.50 | 0.50 | 0.50 | 0.01 | 60.49 |
| Ex. 17B | 2.00 | 2.00 | 4.00 | 0.50 | 0.50 | 0.50 | 0.01 | 56.49 |
| Ex. 18B | 2.00 | 2.00 | 4.00 | 0.50 | 0.50 | 0.50 | 0.01 | 56.99 |
| Ex. 19B | 2.00 | 2.00 | 4.00 | 0.50 | 0.50 | 0.50 | 0.01 | 57.49 |
| Ex. 20B | 2.00 | 2.00 | 4.00 | 0.50 | 0.50 | 0.50 | 0.01 | 56.49 |
| Ex. 21B | 2.00 | 2.00 | 4.00 | 0.50 | 0.50 | 0.50 | 0.01 | 60.49 |
| Ex. 22B | 2.00 | 2.00 | 4.00 | 0.50 | 0.50 | 0.50 | 0.01 | 56.49 |

TABLE 3-continued

|  | | | | | | | |  |
|---|---|---|---|---|---|---|---|---|
| Ex. 23B | 2.00 | 2.00 | 4.00 | 0.50 | 0.50 | 0.50 | 0.01 | 57.41 |
| Ex. 24B | 2.00 | 2.00 | 4.00 | 0.50 | 0.50 | 0.50 | 0.01 | 55.09 |
| Ex. 25B | 2.00 | 2.00 | 4.00 | 0.50 | 0.50 | 0.50 | 0.01 | 53.11 |
| Comp. Ex. 1B | 2.00 | 2.00 | 4.00 | 0.50 | 0.50 | 0.50 | 0.01 | 57.49 |
| Comp. Ex. 2B | 2.00 | 2.00 | 4.00 | 0.50 | 0.50 | 0.50 | 0.01 | 58.49 |
| Comp. Ex. 3B | 2.00 | 2.00 | 4.00 | 0.50 | 0.50 | 0.50 | 0.01 | 57.49 |
| Comp. Ex. 4B | 2.00 | 2.00 | 4.00 | 0.50 | 0.50 | 0.50 | 0.01 | 60.49 |
| Comp. Ex. 5B | 2.00 | 2.00 | 4.00 | 0.50 | 0.50 | 0.50 | 0.01 | 56.49 |

2B. Image Recording

The ink jet ink in the respective examples and the respective comparative examples was set in an ink jet recording apparatus as shown in FIGURE.

Thereafter, solid printing was performed on a photo paper by EPSON (glossy) as a recording medium.

3B. Evaluation

Evaluation on Gloss Level

An ink jet printer PX-A550 (manufactured by Seiko Epson Corporation) was filled with the respective prepared ink, and a 100% duty patch pattern was recorded on a recording medium (photo paper <glossy> manufactured by Seiko Epson Corporation). The obtained sample was left in an environment at a normal temperature and a normal humidity (temperature: 20° C., humidity: 65%) for one hour. After leaving the sample, glossiness (gloss level) at 20° in the respective patch part was measured by using a gloss level measuring apparatus GM-268 (manufactured by Konica Minolta Holdings, Inc.), and the gloss value (gloss level) was evaluated based on the following criteria.

A: The gloss level is not less than 150% of recording paper gloss at a regular reflection angle of 20°.
B: The gloss level is not less than 100% and less than 150% of recording paper gloss at a regular reflectance angle of 20°.
C: The gloss level is not less than 50% and less than 100% of recording paper gloss at a regular reflection angle of 20° (acceptable).
D: The gloss level is less than 50% of recording paper gloss at a regular reflection angle of 20° (unacceptable).

Evaluation on OD Value, Chromogenic Property

The ink jet ink in the respective examples and the respective comparative examples was set in the ink jet recording apparatus as shown in FIGURE.

Thereafter, solid printing was performed on an ordinary paper (Xerox-P sheet) as a recording medium.

Od values of the printed solid image were measured five times (at five locations) by using a Gretag spectrophotometer (manufactured by GretagMacbeth LLC). Then, an additive average value of the respective ink jet ink in the examples and the comparative examples was obtained, and optical density values (OD value) of the calculated average OD values were evaluated based on the following determination criteria.

A: The OD value is not less than 1.3.
B: The OD value is not less than 1.2 and less than 1.3.
C: The OD value is not less than 1.1 and less than 1.2 (acceptable).
D: The OD value is less than 1.1 (unacceptable).

Cloth Scrubbing Test, Fixability Evaluation 1

An ink jet printer PX-A550 (manufactured by Seiko Epson Corporation) was filled with the respective prepared ink, and a 100% duty patch pattern was recorded on a recording medium (photo paper <glossy> manufactured by Seiko Epson Corporation). The obtained sample was left in an environment at a normal temperature and a normal humidity (temperature: 20° C., humidity: 65%) for one hour. After leaving the sample, a patch part was wiped at a speed of 1 cm/second so as to be scrubbed with a surface of Bemcot M-3 (manufactured by Asahi Kasei Corporation) as scrubbing cloth while the scrubbing cloth was pressurized by a weight with a diameter of 10 mm and a load of 200 g. The respective patch parts and the scrubbing surface of Bemcot after the scrubbing were visually observed, and determination was made based on the following evaluation criteria.

A: Scratch by the cloth scrubbing was not observed at all.
B: Although scratch was observed, no contamination was observed on the surface of the cloth.
C: Scratch was observed, and a small amount of contamination was observed on the surface of the cloth (acceptable).
D: Scratch was observed, and a large amount of contamination was observed on the surface of the cloth (unacceptable).

Line Marker Test, Fixability Evaluation 2

An ink jet printer PX-A550 (manufactured by Seiko Epson Corporation) was filled with the respective prepared ink, and a 24-point character pattern was recorded on a recording medium (Xerox4200). The obtained sample was left in an environment at a normal temperature and a normal humidity (temperature: 20° C., humidity: 65%) for twenty four hour. After leaving the sample, the printed character was scrubbed by using a water-based yellow highlighter ZEBRA PEN2 (registered trademark) manufactured by Zebra Co., Ltd. at a writing pressure of 300 g/15 mm. The recorded character after the scrubbing was visually observed, and determination was made based on the following evaluation criteria.

A: No contamination was observed at all after a same part was scrubbed twice. B: Although no contamination was observed after the first scrubbing, contamination was observed after the second scrubbing. C: A small amount of contamination was observed after the first scrubbing (acceptable). D: A large amount of contamination was observed after the first scrubbing (unacceptable).

Permanent Curl Test

Solid printing at a duty of 100% was performed on an ordinary paper (Xerox 4200 manufactured by Xerox Corporation) as a recording medium by using the ink jet recording apparatus as shown in FIGURE. The obtained recorded objects were left for twenty four hours and visually observed, and evaluation was made based on the following determination criteria.

A: An amount of curl after leaving the recorded object for twenty four hours is less than 10 mm and is acceptable. B: An amount of curl after leaving the recorded object for twenty four hours is not less than 10 mm and less than 30 mm and is acceptable. C: An amount of curl after leaving the recorded object for twenty four hours is not less than 30 mm and less than 50 mm and is acceptable. D: An amount of curl after leaving the recorded object for twenty four hours is not less than 50 mm and is not acceptable.

The results will be shown in Table 4. In addition, a content ratio of the compound (C2) with respect to the sum of the content of the first resin (A) and the second resin (B) (these will be collectively referred to as a "resin constituent" in the table).

TABLE 4

| | Content ratio of compound (C) with respect to resin constituent | gloss level | OD value | Fixation strength 1 | Fixation strength 2 | Permanent curl |
|---|---|---|---|---|---|---|
| Example 1B | 0.33 | A | B | A | A | A |
| Example 2B | 0.33 | A | B | A | A | A |
| Example 3B | 0.33 | B | B | A | A | B |
| Example 4B | 0.33 | A | B | A | A | B |
| Example 5B | 0.33 | A | B | A | A | A |
| Example 6B | 0.33 | A | B | A | A | B |
| Example 7B | 0.33 | B | A | A | A | A |
| Example 8B | 0.40 | A | B | A | B | A |
| Example 9B | 0.25 | B | B | A | A | A |
| Example 10B | 0.29 | A | B | A | A | A |
| Example 11B | 0.40 | A | B | A | A | B |
| Example 12B | 0.25 | B | B | A | A | A |
| Example 13B | 0.50 | A | B | B | A | B |
| Example 14B | 0.20 | B | B | A | A | A |
| Example 15B | 0.33 | A | B | A | A | A |
| Example 16B | 0.33 | A | B | A | A | B |
| Example 17B | 0.33 | B | B | A | A | A |
| Example 18B | 0.17 | B | B | B | A | A |
| Example 19B | 0.67 | B | B | A | A | A |
| Example 20B | 0.33 | A | B | A | A | A |
| Example 21B | 0.33 | A | B | A | A | B |
| Example 22B | 0.33 | A | B | A | A | A |
| Example 23B | 0.23 | B | B | B | B | B |
| Example 24B | 0.29 | A | B | A | A | B |
| Example 25B | 0.48 | A | B | A | A | A |
| Comparative Example 1B | — | C | B | B | D | B |
| Comparative Example 2B | — | D | B | D | C | B |
| Comparative Example 3B | — | D | B | C | B | B |
| Comparative Example 4B | — | A | D | A | A | C |
| Comparative Example 5B | — | C | B | C | D | A |

As is obvious from Table 4, it was possible to record images, which are excellent in glossiness, with the ink jet ink according to the invention. In addition, the images recorded with the ink jet ink according to the invention were also excellent in the chromogenic property and the fixability. According to the invention, it was possible to suppress occurrence of curl and obtain recorded objects with high quality. On the other hand, it was not possible to achieve satisfactory results in the respective comparative examples.

What is claimed is:
1. Ink jet ink comprising:
   a pigment;
   a first resin (A) with a glass-transition temperature of less than 20° C. and a weight-average molecular weight of not more than 10000;
   a second resin (B) with a glass-transition temperature of not less than 23° C.; and
   a polyoxyalkylene glycol monoalkyl ether (C), the polyoxyalkylene glycol monoalkyl ether (C) being either a compound (C1) or a compound (C2)
   wherein compound (C1) has the following formula (1):

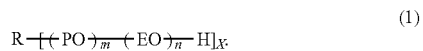

(1)

wherein in the formula (1), R represents an x-valent alkoxy group containing four to thirty carbons, PO represents a propyleneoxy group, EO represents an ethyleneoxy group, m represents an integer from zero to ten, n represents an integer from ten to thirty, and X represents an integer from one to three, and
   wherein compound (C2) has the following formula (2):

(2)

wherein in the formula (2), R represents an x-valent alkoxy group containing four to thirty carbons, EO represents an ethyleneoxy group, and n represents an integer from four to twenty.

2. The ink jet ink according to claim 1, wherein a content ratio on a mass % basis of the polyoxyalkylene glycol monoalkyl ether (C) with respect to sum of content of the first resin (A) and the second resin (B) is not less than 0.25 and not more than 0.50.

3. The ink jet ink according to claim 1,
wherein a content ratio on a mass % basis of the compound (C1) with respect to sum of the content of the first resin (A) and the second resin (B) is not less than 0.30 and not more than 0.50.

4. The ink jet ink according to claim 1,
wherein a content ratio on a mass % basis of the compound (C2) with respect to sum of the content of the first resin (A) and the second resin (B) is not less than 0.25 and not more than 0.50.

5. The ink jet ink according to claim 1,
wherein a weight-average molecular weight of the second resin (B) is more than 10000.

6. The ink jet ink according to claim 1,
wherein the first resin (A) is at least one kind selected from a group consisting of styrene acrylate copolymer and polyurethane resin.

7. The ink jet ink according to claim 1,
wherein the second resin (B) is at least one kind selected from a group consisting of styrene acrylate copolymer and polyurethane resin.

8. The ink jet ink according to claim 1, further comprising:
an amphoteric ion compound.

9. The ink jet ink according to claim 6,
wherein the amphoteric ion compound is a betaine series compound with a molecular weight of not less than 100 and not more than 250.

10. The ink jet ink according to claim 8,
wherein the content of the amphoteric ion compound is not less than 5% by mass and not more than 40% by mass.

\* \* \* \* \*